United States Patent
Heim (10) Patent No.: US 7,611,168 B2
(45) Date of Patent: Nov. 3, 2009

(54) SECURITY DOCUMENT AND SECURITY ELEMENT FOR A SECURITY DOCUMENT

(75) Inventor: Manfred Heim, Munich (DE)

(73) Assignee: Giesecke & Devrient GmbH, Munich (DE)

(*) Notice: Subject to any disclaimer, the term of this patent is extended or adjusted under 35 U.S.C. 154(b) by 471 days.

(21) Appl. No.: 10/504,816

(22) PCT Filed: Feb. 19, 2003

(86) PCT No.: PCT/EP03/01677

§ 371 (c)(1),
(2), (4) Date: Aug. 17, 2004

(87) PCT Pub. No.: WO03/070482

PCT Pub. Date: Aug. 28, 2003

(65) Prior Publication Data

US 2005/0151368 A1    Jul. 14, 2005

(30) Foreign Application Priority Data

Feb. 22, 2002  (DE) ............................ 102 07 622

(51) Int. Cl.
*B42D 15/00*   (2006.01)
*G03H 1/00*    (2006.01)
(52) U.S. Cl. .................... 283/85; 283/87; 283/89; 283/57; 283/58; 359/2
(58) Field of Classification Search .............. 283/72, 283/85, 87, 89, 94, 117, 901, 57, 58, 59, 283/113, 90; 359/2, 567; 430/10; 162/140, 162/134
See application file for complete search history.

(56) References Cited

U.S. PATENT DOCUMENTS

| | | | | |
|---|---|---|---|---|
| 2,388,352 A | * | 11/1945 | Vent ............................ | 356/33 |
| 4,186,943 A | * | 2/1980 | Lee ............................. | 283/91 |
| 4,501,439 A | * | 2/1985 | Antes .......................... | 283/91 |
| 5,298,922 A | | 3/1994 | Merkle et al. | |
| 5,347,111 A | * | 9/1994 | Hoshino ..................... | 235/457 |
| 5,388,862 A | * | 2/1995 | Edwards ..................... | 283/82 |
| 5,438,403 A | * | 8/1995 | Hoshino et al. ............. | 356/71 |
| 5,497,227 A | * | 3/1996 | Takeuchi et al. ............ | 356/71 |
| 5,516,153 A | * | 5/1996 | Kaule .......................... | 283/85 |
| 5,599,047 A | * | 2/1997 | Kaule et al. ................. | 283/85 |

(Continued)

FOREIGN PATENT DOCUMENTS

DE    43 34 848 C    1/1995

(Continued)

*Primary Examiner*—Dana Ross
*Assistant Examiner*—Pradeep C Battula
(74) *Attorney, Agent, or Firm*—Rothwell, Figg, Ernst & Manbeck, P.C.

(57) ABSTRACT

Security element 2, 4 to be embedded in or applied to a security document so that it is visually recognizable from both sides of security document 1 is of multilayer construction and includes interference element I with a color shift effect and diffraction structures 8. Depending on the arrangement of the layers and existing diffraction structures 8 on transparent substrate S the color shift effect and/or the diffractive effects are perceptible from one or both sides of security element 2, 4. The security element is suitable in particular as two-sided windowed thread 4 and as label or transfer element 2 over hole 3.

37 Claims, 4 Drawing Sheets

U.S. PATENT DOCUMENTS

| | | | |
|---|---|---|---|
| 5,629,068 A * | 5/1997 | Miekka et al. | 428/148 |
| 6,036,232 A * | 3/2000 | Kaule et al. | 283/85 |
| 6,089,614 A * | 7/2000 | Howland et al. | 283/91 |
| 6,157,489 A * | 12/2000 | Bradley et al. | 359/584 |
| 6,236,510 B1 * | 5/2001 | Bradley et al. | 359/585 |
| 6,491,324 B1 * | 12/2002 | Schmitz et al. | 283/82 |
| 6,545,809 B1 * | 4/2003 | Phillips | 359/577 |
| 6,569,529 B1 * | 5/2003 | Phillips et al. | 428/403 |
| 6,686,027 B1 * | 2/2004 | Caporaletti et al. | 428/195.1 |
| 6,761,959 B1 * | 7/2004 | Bonkowski et al. | 428/156 |
| 6,991,860 B2 * | 1/2006 | Phillips et al. | 428/704 |
| 7,040,663 B1 * | 5/2006 | Plaschka et al. | 283/72 |
| 2002/0160194 A1 * | 10/2002 | Phillips et al. | 428/403 |
| 2003/0129404 A1 * | 7/2003 | Argoitia et al. | 428/403 |
| 2003/0161017 A1 * | 8/2003 | Hudson et al. | 359/2 |
| 2004/0101676 A1 * | 5/2004 | Phillips et al. | 428/323 |

FOREIGN PATENT DOCUMENTS

WO    WO 01/53113 A    7/2001

* cited by examiner

SECURITY DOCUMENT AND SECURITY ELEMENT FOR A SECURITY DOCUMENT

CROSS-REFERENCE TO RELATED APPLICATIONS

This application is a National Phase of International Application Serial No. PCT/EP03/01677, filed Feb. 19, 2003.

FIELD OF THE INVENTION

This invention relates to a security element and to a security document, in particular paper of value such as a bank note, having such a security element. The invention likewise relates to a semifinished product for producing such a security document. In particular, the invention relates to a security element in the form of a security thread to be embedded in the security document as a so-called windowed thread and in the form of a label or transfer element to be applied to the security document.

DESCRIPTION OF THE BACKGROUND ART

Security documents according to the present invention are in particular bank notes but also checks, check cards, credit cards, ID cards, passports, admission tickets, travel tickets and the like. Semifinished products for producing the aforementioned security documents may be for example unprinted security paper and other unprinted security document substrates.

SUMMARY OF THE INVENTION

The aforementioned security documents are usually equipped with embedded security threads or applied security labels or transfer elements for protection against imitation and as proof of authenticity. Security threads in the form of windowed threads are widely known for example in connection with documents of value such as bank notes, but are also fundamentally suitable for use in check cards and the like. Windowed threads are embedded in the basic material of the security document and appear periodically on the security document surface so that they are visually recognizable in these "window areas." In translucent substrates there is a so-called reflected/transmitted light effect whereby the security thread appears as a dark strip compared to the surrounding material when viewed in transmitted light. In reflected light, however, the security thread is only recognizable in the window areas.

There is a distinction between simple windowed threads appearing only on one surface, and two-sided windowed threads appearing on both surfaces, a special case of the two-sided windowed thread being referred to in the following as a lookthrough windowed thread, which is visible simultaneously from both sides of the document of value. A lookthrough windowed thread spans a hole or transparent area in the document of value, so to speak. A further two-sided windowed thread is the security thread referred to hereinafter as an alternating windowed thread, which is visible alternately on the front and back of a document. Alongside security threads, it is also possible to use so-called transfer elements as security elements, these usually spanning gaps, e.g. a hole, in a document.

The security elements have complex security features that are checkable visually and/or by machine and are imitable only with great effort. To additionally increase the protection from forgery, such security elements frequently have a plurality of different security features that can also have a new joint effect in combination.

A security feature frequently encountered in security elements is a multilayer dichroic coating whose color effect changes depending on the viewing angle and/or depending on viewing in transmitted light or reflected light. This phenomenon is based on interference effects due to the overlay of multiple reflections and/or transmissions of light waves within the layer structure in combination with selective absorption properties of the layer materials. The color change at varying viewing angle is also referred to as a color shift effect. The color change upon alternating viewing in reflected light and transmitted light, however, will be designated a color change effect in the following.

Optical interference coatings with a color shift effect are described in connection with security elements for example in EP 0 341 002 B1 and U.S. Pat. No. 3,858,977. Depending on the type and number of layers in the layer structure, there may be two, three, four or more different color effects dependent on viewing angle. The reflection and transmission properties of such color shift effect layers depend on a plurality of factors, in particular the refractive indexes, absorption coefficients and layer thicknesses as well as the number of layers of the layer structure.

Although security elements with a dichroic coating have been proposed, there is still a need for improved security elements.

The problem of the present invention is therefore to provide security elements, in particular a security thread or transfer element, that have elevated forgery-proofness in comparison with the prior art.

This problem is solved according to the invention by a security element and a security document or semifinished product having the features described herein. Advantageous developments and embodiments of the invention are also described herein.

Accordingly, the security element includes a multilayer interference element that produces a color shift effect on both the front and the back of the security element when the security element is viewed at different angles. The color shift effect can be designed to be identical or different on the front and back of the security element.

In addition, the security element preferably has diffraction structures that at least partly overlap the interference element.

Due to the complex multilayer structure of the security elements and the thus poorly copiable diffractive, color shift and color change effects, they are imitable only with great effort.

The interference element is constituted by superimposed interference layers, the absorber and dielectric layers, whereby a plurality of absorber and dielectric layers can also be superimposed alternately. Instead of alternating absorber and dielectric layers, solely dielectric layers can also be provided, whereby adjacent layers have very different refraction indexes so that a color shift effect is produced. The use of absorber layers is advantageous, however, because the color shift effects are better visible.

Interference element I can fundamentally be of multilayer structure, but preferably includes at least three interference layers, namely two absorber layers $A_1, A_2$ and dielectric layer D located between the absorber layers. Such a three-layer interference element can cause a dichroic color shift effect at changing viewing angles and/or at a change between reflected light and transmitted light viewing. Further dielectric and/or absorber layers in alternating order can achieve further color changes or intensify color changes.

Absorber layers A1, A2 typically used are metal layers made of materials like chromium, iron, gold, aluminum or titanium in a thickness of preferably 4 nanometers to 20 nanometers. Absorber layer materials used can also be compounds like nickel-chromium-iron or rarer metals like vanadium, palladium or molybdenum. Further suitable materials are e.g. nickel, cobalt, tungsten, niobium, aluminum, metal compounds such as metal fluorides, oxides, sulfides, nitrides, carbides, phosphides, selenides, silicides and compounds thereof, as well as carbon, germanium, cermet, ferric oxide and the like. The absorber layers can be identical, but can also be of different thickness and/or different material.

Materials to be used for the dielectric layer are primarily transparent materials with a low refractive index <1.7, for example SiO2, MgF, SiOx with 1<x<2 and $Al_2O_3$. Almost all vapor-depositable, transparent compounds can fundamentally be used, in particular also more highly refractive coating materials, such as $ZrO_2$, ZnS, $TiO_2$ and indium tin oxides (ITO). The layer thickness of dielectric layer D is in the range of 100 nanometers to 1000 nanometers, preferably 200 nanometers to 500 nanometers.

Especially thin interference layers are preferred.

The absorber and dielectric layers of interference element I are preferably produced by vacuum vapor deposition on substrate S, which can be part of security element 1 but can also serve only as an intermediate carrier and be removed at the latest when the security element is applied to or embedded in an object.

A great variety of vapor deposition methods are suitable for producing the layers. One systematic group is physical vapor deposition (PVD) with vapor deposition by boats, resistance heating, induction heating or also electron beam, sputtering (DC or AC) and arc vapor deposition. On the other hand, vapor deposition can also be effected as chemical vapor deposition (CVD), e.g. sputtering in reactive plasma or any other plasma-enhanced type of vapor deposition. It is fundamentally also possible to print dielectric layers on.

The structure of the interference element can be selected so that the interplay of colors is the same or different depending on the viewing side of the security element. The interference element is preferably of symmetric design, i.e. the viewer perceives the same color shift effect on the front and back of the security element. Different effects result for example by varying the materials used in individual layers and/or varying the layer thicknesses of the single layers building up the interference element.

The interference element is of semitransparent design. "Semitransparency" refers in this connection to translucency, i.e. the layer has a transparency of under 90 percent, preferably between 80 percent and 20 percent.

Diffraction structures to be used are refraction patterns, transmission, volume or reflection holograms, as well as grid structures, which are preferably part of the substrate bearing the interference element but can also be incorporated into any other suitable layer or an additional layer. The additional layer can be e.g. a lacquer layer.

The diffraction structures are preferably incorporated, in particular embossed, into the surface of a transparent plastic substrate constituting the security element. The interference element can be present on the side of the plastic substrate where the relief structure is embossed, or on the opposite, smooth side of the substrate. The interference layers are then applied to the plastic substrate, in particular vapor-deposited in a vacuum. Embossing of the plastic substrate can also be effected after the vapor deposition process, however. There are thus a plurality of variants that have different visual effects and can therefore be more or less preferable depending on the purpose.

It is especially advantageous if the diffraction structures are constituted by a relief pattern that directly adjoins the interference layer. Then the diffraction effects are almost equally well recognizable from each viewing side of the security element. If the security element is embedded in a document as a two-sided windowed thread, the diffraction effect is visible from both sides. The same holds if the security element is applied before a hole or as a lookthrough windowed thread when such a document is viewed in reflected light, for example on a base.

The optical effect of such a security element is determined essentially by the color effect of the interference element from both viewing sides. The diffraction structures essentially determine the optical appearance at least from one viewing side, in the case of a suitable layer structure from both viewing sides. In this case the effects of both security features overlap.

The diffraction effects stand out optically especially upon viewing in reflected light, e.g. if the document is resting on a base. Upon viewing in transmitted light, the diffraction effects distinctly recede. The color shift effect is pronounced in both reflected light and transmitted light.

Such a security element is particularly suitable for covering e.g. printed information on an object that is to be recognizable only at a certain viewing angle. With a security element that appears green at a first viewing angle and golden at a second viewing angle, information printed for example in a golden color is recognizable only at the second viewing angle. With a suitable color choice of the color shift effect and the information, the latter is thus well perceptible at certain viewing angles but almost invisible at other viewing angles.

Such a security element is especially suitable for use as a two-sided security thread since it shows from each viewing side especially characteristic security features that are visually checkable. Such a two-sided security thread can be used as an alternating security thread, that comes to the surface or is at least visible at different points of the security document on the opposite security document surfaces. However, it can also be used as a lookthrough windowed thread where it is visually recognizable from both sides of the document in an especially thin or transparent area of the document or where it spans a hole in the document.

Such a security element is also suitable as a transfer element e.g. in the form of a label or patch applied to one surface of the security document over a hole. Viewed from one side of the document, there is the optical impression of a patch with a color shift effect. Viewed from the other side, a section of the patch with a different or optionally an identical color shift effect is seen through the hole of the document, it depending on the specific layer structure of the security element whether an optionally present diffraction design is recognizable from both sides or only from one side.

A "transfer element" according to the invention is a security element that is prepared on a separate carrier layer, for example a plastic foil, in the reverse order to that in which it later comes to lie on the security paper, and is then transferred to the security paper by means of an adhesive or lacquer layer in the desired contour forms. The form of the security element is not limited, and any contour forms are possible including filigree structures, such as guilloches, etc. The security elements are frequently also formed as strips extending parallel to the edge of the document of value. The carrier layer can be removed from the layer structure of the security element after transfer, or remains on the layer structure as a protective layer as a firm part of the security element.

The individual transfer elements can be prepared on the carrier layer as separate individual elements in the contour forms to be transferred. Alternatively, the layer sequence of the transfer elements is provided on the carrier layer in continuous form. Such carrier layers with spaced-apart individual transfer elements or a continuously extending layer structure will be referred to hereinafter as "transfer material," and the layer sequence of the security element disposed on the carrier layer as the "transfer layer."

In the case of the continuous transfer layer, the transfer material is then connected with the security paper via an adhesive layer and the adhesive layer activated via suitable embossing tools so that the transfer layer adheres to the security paper only in the activated areas. All other areas are then removed with the carrier layer. Alternatively, the adhesive layer can also be executed in the form of the security element to be transferred. Hot-melt adhesives are preferably used as adhesives. However, any other adhesives can also be used, such as reaction lacquers.

The inventively constructed security element can be combined with further security features, in particular with negative or positive writing by locally removing at least one of the interference layers of the interference element. With a multilayer interference element, one up to all the layers can be locally removed. With an interference element consisting for example of a first absorber layer, a dielectric layer adjoining and overlying the first absorber layer and a second absorber layer adjoining and overlying the dielectric layer, the gaps are preferably located in the first and/or second absorber layer. The writing preferably consists of alphanumeric characters, but is not limited thereto. It may involve any representable pattern, sign or encoding according to the invention. The gaps in the layer structure thus result in an additional reflected/transmitted light effect.

The signs, patterns and encodings of such a security element embedded in a document of value, for example as a security thread, are hardly perceptible in reflected light but stand out distinctly when viewed in transmitted light as lighter areas compared to dark surroundings. Depending on which layers in the interference element are locally removed, color effects can also be controlled in reflected and transmitted light.

BRIEF DESCRIPTION OF THE DRAWINGS

These properties and particular advantages of the individual variants will be explained in the following with reference to the associated drawings. The proportions shown in the figures do not necessarily correspond to the actual relations and serve primarily to improve clarity.

The technical explanations on the individual figures will not be restricted to the particular embodiments shown, but also hold for explaining the general inventive idea.

DETAILED DESCRIPTION OF THE INVENTION

Figure 1:
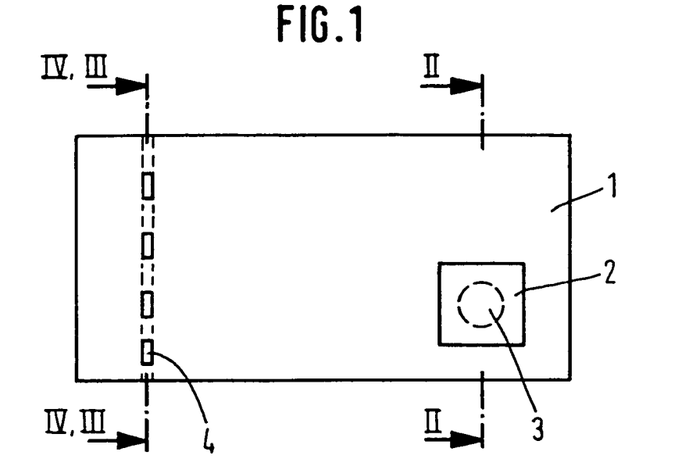
FIG. 1 shows a bank note with a semitransparent patch applied to one surface over a hole in the bank note.

FIG. 1 shows security document 1, for example a paper bank note or plastic ID card, that is equipped with two security elements 2, 4. First security element 2 is a patch that is applied to a surface of document 1 as a label or transfer element over hole or other transparent area 3 of document 1, for example by means of an adhesive. Second security element 4 is a two-sided windowed security thread that is embedded in document 1 either alternatingly or as a lookthrough windowed thread.

Figure 2:
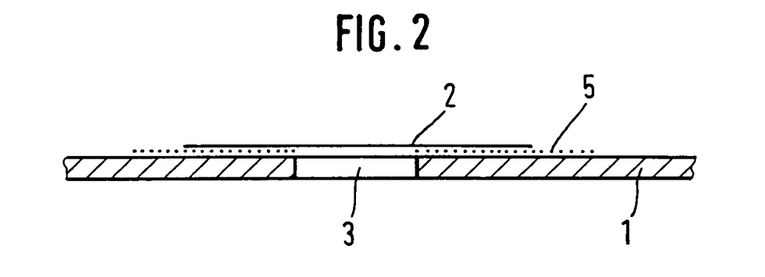
FIG. 2 shows a cross section through the bank note from FIG. 1 along line II-II.
Figure 3:
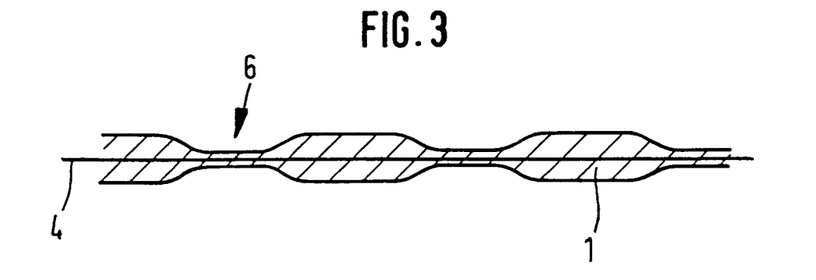
FIG. 3 shows a cross section through the bank note according to FIG. 1 along line III-III with a lookthrough windowed thread.
Figure 4:
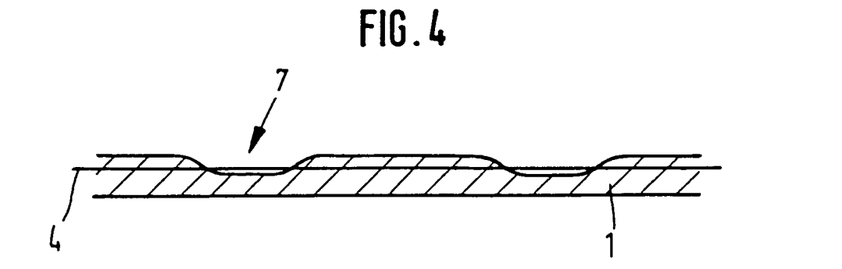
FIG. 4 shows a cross section through the bank note according to FIG. 1 along line IV-IV with a simple windowed security thread.

FIGS. 2 to 4 show the different manners of applying and embedding security elements 2 and 4 by way of example.

FIG. 2 shows security document 1 from FIG. 1 in cross section along line II-II through the patch. Viewing such a bank note in reflected light, for example with it resting on a base, the diffraction effects stand out distinctly. Viewed in transmitted light, the diffraction effects are hardly perceptible. Both in reflected light and in transmitted light the color shift effect at different viewing angles is retained.

The hole can be produced e.g. during papermaking by papermaking means or be punched into the paper subsequently. With suitable design of the color shift effect and corresponding color coordination of print 5, the print can be hidden under patch 2 at a certain viewing angle but be visible at another angle. For example, a magenta print can be located under a color shift element between magenta and green. At the viewing angle where the color shift element appears magenta, the print is therefore invisible and the color shift element seemingly opaque. At the viewing angle where the color shift element appears green, the print thereunder can be perceived and the color shift element appears semitransparent. Patch 2 is recognizable from both sides in the area of hole 3.

FIG. 3 shows the windowed security thread from FIG. 1 as a lookthrough windowed thread. For this purpose, document 1, for example a bank note, has window areas 6 that are formed very thin and in extreme cases as a hole, so that security thread 4 is visible from both sides of document 1. The optical effect of security thread 4 in reflected light and transmitted light then corresponds to the appearance of patch 2 described with respect to FIG. 2. Lookthrough window areas 6 have the same function as hole 3. If the interference layers and diffraction structures are selected so that the color shift effect is the same regardless of the viewing side, true-to-side incorporation of the security thread is also unnecessary The security thread can also be embedded in a document as an alternating two-sided windowed security thread (not shown). The thread extends here in windows alternately visible on one and the other side of the document. Regardless of the viewing side of the document, the color shift effect is then recognizable in the window areas.

Such a security thread 4 is of course also usable as a simple windowed security thread that passes to the surface only on one side in windows 7, as shown in FIG. 4.

Methods for embedding a two-sided alternating windowed thread for example in bank notes are known to the expert.

FIGS. 5 to 8 show different layer structures of inventive security element 2, 4 in a detail view in cross section.

As explained in the following with reference to FIGS. 5 to 8, both security elements are of multilayer design and have an inventive interference element producing a color shift effect and overlaid with diffraction structures. Accordingly, the interference element and the diffraction structures have an influence on the appearance of the security element for each viewing side. Depending on the design of the layer structure, the appearance of the security element can be the same on both sides but also be different depending on the viewing side.

Figure 5:
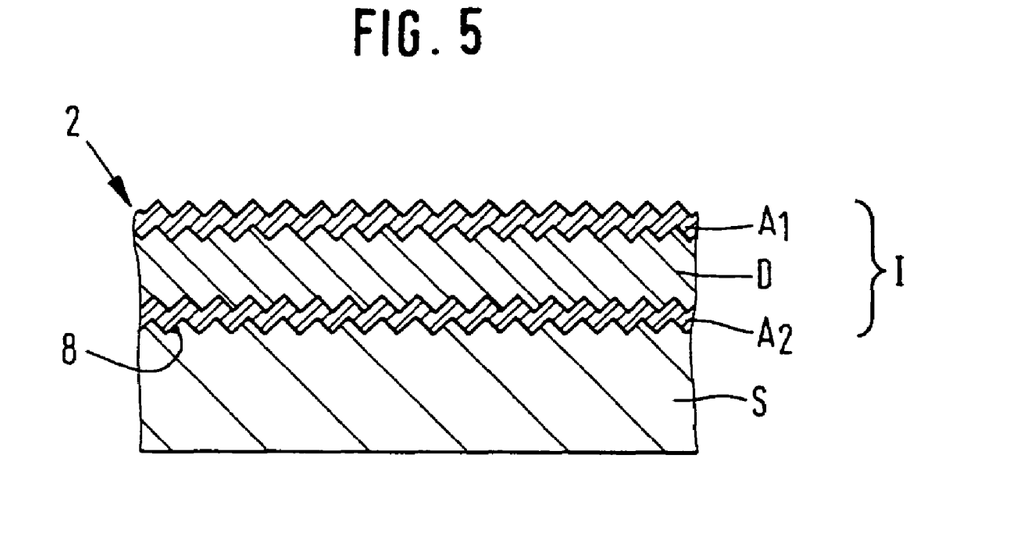
FIG. 5 shows the layer structure of a security element according to a first embodiment.

FIG. 5 shows a detail in cross section of the layer structure of security element 2. Security element 4 can be constructed accordingly. Transparent substrate S, preferably a plastic foil, has on one side embossed holographic surface relief 8 that is overlaid directly by interference element I. Alternatively, surface relief 8 can also be embossed in an additional lacquer layer, whereby the lacquer layer can be present on one of the two substrate sides or on the external side of absorber layer $A_1$.

Interference element I, consisting of two absorber layers and one dielectric layer, has a dichroic color shift effect at different viewing angles, for example a change between green and magenta. If the same materials and layer thicknesses are used for particular absorber layers $A_1$ and $A_2$ the security element has the same color shift effect on the front and back. Any further interference layers and/or transparent layers can be provided over interference element I.

The diffractive effect of a security element with a layer structure according to FIG. 5 is well recognizable from each viewing side in reflected light. In transmitted light, the diffractive effects recede almost completely. The color shift effect is recognizable on both sides of the security element both in reflected light and in transmitted light.

Since the interference layers each have only a layer thickness of under one micron (the figures rendering the layer structure only schematically), all layers have the same relief pattern as relief structure 8 on which the layers are vapor-deposited. This has the consequence that the holographic effects caused by relief structure 8 are recognizable from both viewing sides. If the interference element is of symmetric design with a layer structure according to FIG. 5, such a security element can be used especially well as a two-sided security thread because the diffractive effect and the color shift effect are almost identical on both sides. When embedding the security thread one therefore need not worry about trueness to side.

Figure 6:
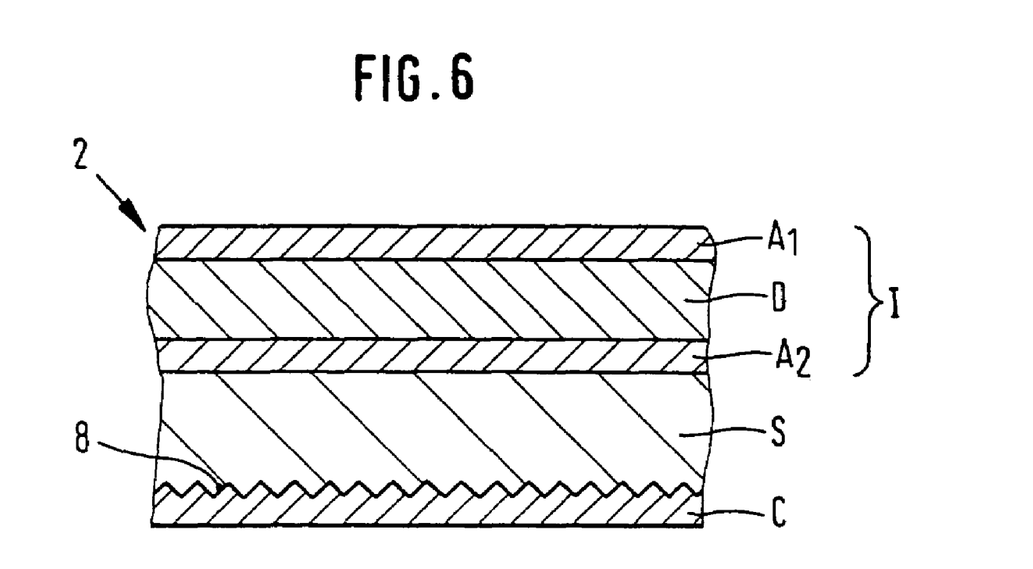
FIG. 6 shows the layer structure of a security element according to a second embodiment.

FIG. 6 shows an alternative layer structure of security element 2. In this case surface relief 8 is embossed in the substrate surface on the side of substrate S facing away from interference element I. Optional protective layer C covers sensitive relief structure 8. The refractive index of protective layer C differs essentially from the refractive index of substrate S so that the diffractive effect produced by the relief structure is as pronounced as possible. Alternatively, the protective layer can also be a two-layer system. For example, a highly refractive layer, e.g. of $TiO_2$, ZnS, $ZrO_2$ or the like, can be vapor-deposited on relief structure 8 and a protective layer applied thereto. In this case the refractive index of the protective layer need not meet any special requirements.

When such a security document is viewed from absorber layer $A_1$, a color shift effect is perceptible. Holographic effects do not occur on this viewing side. When the same security element is viewed from the opposite side, i.e. from the substrate side, a diffractive effect produced by diffraction structure 8 and the color shift effect are perceptible. Altogether, a layer structure according to FIG. 6 thus produces a hologram effect combined with a color shift effect on one viewing side, and a color shift effect without overlaid diffractive effects on the other viewing side.

Figure 7:
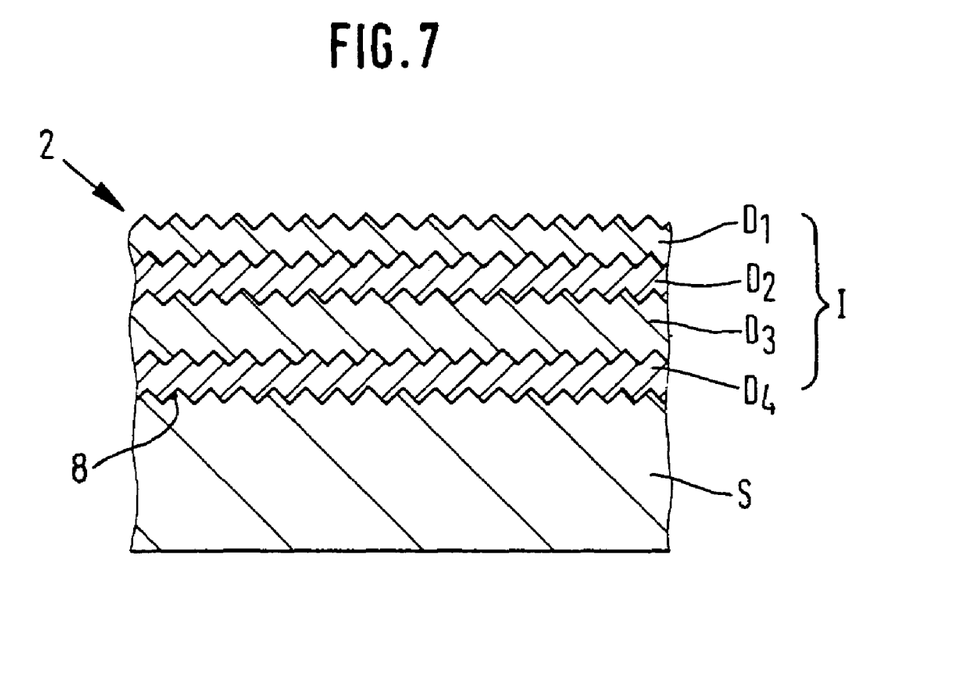
FIG. 7 shows the layer structure of a security element according to a third embodiment.

Instead of absorber layers $A_1$, $A_2$, dielectric layers D can also be used, whereby refractive index n of adjacent dielectric layers D must be very different, on the one hand n<1.7 and on the other hand n>1.7, to cause a distinct color shift effect. Such a layer structure is shown in FIG. 7 with four superimposed dielectric layers $D_1$ to $D_4$. Apart from the different layer structure of interference element I, security element 2 according to FIG. 7 corresponds to security element 2 according to FIG. 5. The color shift effect of such a layer structure is usually less pronounced than with a structure as in FIG. 5. However, the light transmission is considerably higher, being >70 percent, often also >85 percent.

Figure 8:
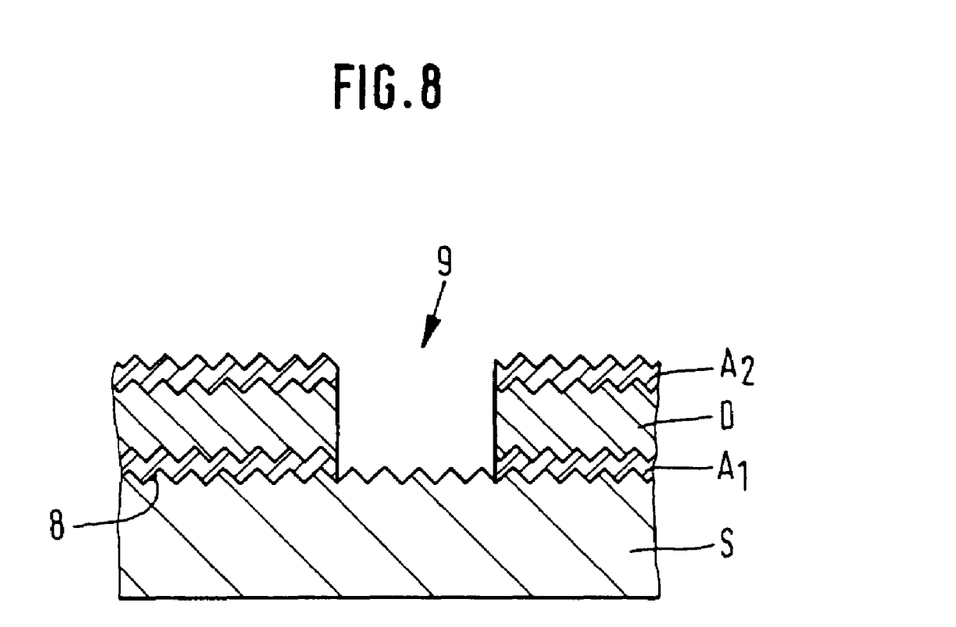
FIG. 8 shows the layer structure of the security element according to FIG. 5 with gaps in the interference element.
Figure 9:
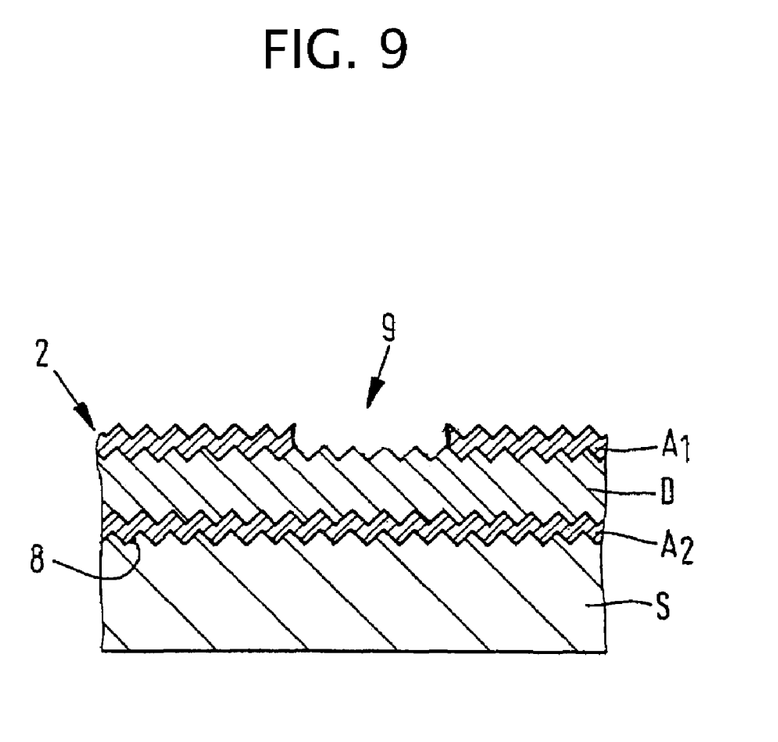
FIG. 9 shows the layer structure of the security element according to FIG. 5 with a gap existing only in one of the absorber layers.

FIG. 8 shows an advantageous embodiment of the invention wherein interference element I has gap 9, which is to be seen only in cross section in FIG. 8. In a top view, gap 9 can have the form of signs, patterns or encodings. These patterns, signs or encodings optically stand out particularly in transmitted light. The security element is transparent or at least semitransparent in the area of gaps 9 and shows no color shift effect or one differing from the areas surrounding the gaps. If the interference layers are removed completely in the gaps, the gaps can be made to appear completely colorless in transmitted light. This obtains an additional reflected/transmitted light effect. If such a security element is embedded for example in a bank note as a security thread, gaps 9, which can have the form of signs, patterns or encodings, are less well or even hardly perceptible in reflected light, depending on the design of the layer structure. When viewed in transmitted light, they stand out as light areas from the otherwise dark-looking security thread. In reflected and transmitted light the color shift effect is visible both from the substrate side and from the side opposite the substrate side. Additionally, the gaps are to be recognized in transmitted light. The diffractive effects due to diffraction structures 8 are visible from both sides of the security element in reflected light. The color shift effects are no longer recognizable in the areas of the gaps.

Gaps 9 in interference element I can be produced by laser ablation on an intermediate carrier bearing interference element I, or only on substrate S. Substrate S can also be printed with soluble ink in the area of gaps 9 before the interference layers are vapor-deposited, and in a following process the soluble ink can be dissolved with the interference layers thereabove in the area of gaps 9. The expert is familiar with numerous other methods for producing gaps 9.

If the interference layers are not removed completely in the gaps, e.g. if gaps are only present in one or both absorber layers, the additional presence of diffraction structures can also be omitted.

EXAMPLE 1

In a surface of a transparent plastic foil, diffraction structures were embossed. On these diffraction structures an interference element with the following layer structure was vapor-deposited:

absorber layer of chromium with a layer thickness of 8 nanometers, dielectric laser of $SiO_2$ with an optical path length of 480 nanometers, absorber layer of chromium with a layer thickness of 8 nanometers.

The thus formed security element was applied to a bank note over a hole. The security element had a distinct color shift effect from green upon perpendicular viewing to magenta when viewed at an angle <45°.

When viewed in transmitted light the security element is translucent and the color shift effect distinctly visible from both viewing sides. The hologram effects receded almost completely when viewed in transmitted light.

When viewed in reflected light on a base, however, the hologram effect is distinctly visible, from both sides of the security element. The color shift effect is also distinctly visible. In combination with the colored interference element the holographic effects aroused an extremely colorful impression in contrast to typical reflection holograms with a metallic background.

EXAMPLE 2

The procedure is as in Example 1 except that the interference element has the following layer structure:
- absorber layer of chromium with a layer thickness of 10 nanometers,
- dielectric layer of $SiO_2$ with a layer thickness of 280 nanometers,
- absorber layer of chromium with a layer thickness of 10 nanometers.

Generally and in all described embodiments, substrate S is preferably transparent, possibly colored transparent or coated in colored transparent fashion. Substrate S is preferably a flexible plastic foil that is cut into bands, threads or labels after embossing of relief structure 8 and after coating with interference element I. Substrate S can also be present on a transfer foil and be transferred to the document by the transfer method, for example by hot stamping. In addition to the layer structures according to FIGS. 5 to 8, further protective layers and in particular adhesive layers and cover layers can therefore be provided so that the security element can either be glued to an object as a label after removal of the cover layer or transferred as a transfer element by the transfer method.

The invention claimed is:

1. A security document, or semifinished product for producing the security document, comprising:
    a substrate with first and second opposing substrate surfaces; and
    a multilayer security element that is so connected with the substrate that it is visually recognizable at least from one of the two substrate surfaces, wherein the security element includes a multilayer interference element producing a color shift effect and a layer with diffraction structures that at least partly overlaps the interference element wherein the security element is semitransparent, the interference element has gaps in at least one absorber layer, and the diffraction structures directly adjoin the interference element;
    wherein an effect caused by at least one of the diffraction structures and a color shift effect produced by the interference element is visually recognizable from both sides of the security element depending on the way of viewing the security element;
    and wherein the gaps are only present in at least one of the absorber layers.

2. A security document or semifinished product according to claim 1, wherein the security element is applied to one of the two substrate surfaces and spans a hole or a transparent area in the substrate.

3. A security document or semifinished product according to claim 1, wherein the security element is at least partly embedded in the substrate and spans a hole or a transparent area in the substrate.

4. A security document or semifinished product according to claim 3, wherein the security element is so embedded in the substrate that it is visually recognizable in first areas of the substrate on the first substrate surface and optionally additionally in the second areas of the substrate different from the first areas on the second substrate surface.

5. A security document or semifinished product according to claim 3, wherein the security element is a security thread.

6. A security document or semifinished product according to claim 1, wherein the interference element is present on a transparent plastic substrate.

7. A security document or semifinished product according to claim 6, wherein the plastic substrate is colored.

8. A security document or semifinished product according to claim 6, wherein the plastic substrate has the diffraction structures.

9. A security document or semifinished product according to claim 1, wherein the interference element includes a first absorber layer, a dielectric layer adjoining and overlying the first absorber layer and a second absorber layer adjoining and overlying the dielectric layer.

10. A security document or semifinished product according to claim 1, wherein the interference element includes at least three adjacent, mutually overlying dielectric layers having alternately a high and a low refractive index.

11. A security document or semifinished product according to claim 1, wherein the layers constituting the interference element are vapor-deposited.

12. A security document or semifinished product according to claim 1, wherein the gaps are in the form of signs, patterns or encodings.

13. The security document or semifinished product of claim 12, wherein said gaps are present only in one of the layers of the interference element.

14. A security document or semifinished product according to claim 1, wherein the diffraction structures are present in a separate layer.

15. A security document or semifinished product according to claim 1, wherein the diffraction structures include an embossed relief pattern.

16. A security document or semifinished product according to claim 1, wherein an effect caused by the diffraction structures is visually recognizable from at least one of the sides of the security element depending on the way of viewing the security element.

17. A security document or semifinished product according to claim 1, wherein the effect caused by at least one of the diffraction structures and the color shift effect produced by the interference element are of identical design from both sides of the security element depending on the way of viewing the security element.

18. Use of the security document or semifinished product according to claim 1 for protecting products.

19. The security document or semifinished product of claim 1, comprising paper of value.

20. The security document or semifinished product of claim 19 wherein said paper of value is a bank note.

21. A security document or semifinished product according to claim 1, wherein the interference element has a transparency of under 90 percent.

22. A security document or semifinished product according to claim 21, wherein the interference element has a transparency of between 80 percent and 20 percent.

23. A security element to be embedded in or applied to a security document wherein the security element includes a multilayer interference element producing a color shift effect and a layer with diffraction structures that at least partly overlaps the interference element, characterized in that the security element is semitransparent, the interference element has gaps in at least one absorber layer, and the diffraction structures directly adjoin the interference element, wherein an effect caused by at least one of the diffraction structures and a color shift effect produced by the overlying interference element are visually recognizable from both sides of the security element depending on the way of viewing the security element;

and wherein the gaps are only present in at least one of the absorber layers.

24. A security element according to claim 23, wherein the interference element is present on a transparent plastic substrate.

25. A security element according to claim 24, wherein the layers constituting the interference element are vapor-deposited.

26. A security element according to claim 24, wherein the plastic substrate has the diffraction structures.

27. A security element according to claim 23, wherein the interference element includes a first absorber layer, a dielectric layer adjoining and overlying the first absorber layer and a second absorber layer adjoining and overlying the dielectric layer.

28. A security element according to claim 23, wherein the interference layer includes at least three adjacent, mutually overlying dielectric layers having alternately a high and a low refractive index.

29. A security element according to claim 23, wherein the gaps are in the form of signs, patterns or encodings.

30. The security element of claim 29 wherein said gaps are present only in one of the layers of the interference element.

31. A security element according to claim 23, wherein the diffraction structures are present in a separate layer.

32. A security element according to claim 23, wherein the diffraction structures include an embossed relief pattern.

33. A security element according to claim 23 in the form of a security thread to be embedded in a security document.

34. A security element according to claim 23 as a label or patch to be applied to a security document.

35. A security element according to claim 23 as a transfer element to be applied to a security document by a transfer method.

36. Transfer material for applying a security element to a document of value, wherein the transfer material includes the following layer structure:

a multilayer interference element with a color shift effect, and a layer with diffraction structures that at least partly overlaps the interference element, characterized in that the security element is semitransparent, the interference element has gaps in at least one absorber layer, and the diffraction structures directly adjoin the interference element, wherein an effect caused by at least one of the diffraction structures and a color shift effect produced by the overlying interference element are visually recognizable from both sides of the security element depending on the way of viewing the security element;

and wherein the gaps are only present in at least one of the absorber layers.

37. A method for producing a document of value having a security element, characterized in that the layer structure of the transfer material according to claim 36 is transferred to the document of value in certain areas.

* * * * *

UNITED STATES PATENT AND TRADEMARK OFFICE
CERTIFICATE OF CORRECTION

PATENT NO.      : 7,611,168 B2
APPLICATION NO. : 10/504816
DATED           : November 3, 2009
INVENTOR(S)     : Manfred Heim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Twelfth Day of October, 2010

David J. Kappos
*Director of the United States Patent and Trademark Office*